Dec. 20, 1955 R. G. HEDTKE 2,727,457
SLACK PULLER FOR AUTOMATIC TWINE-TYING BALERS
Filed Aug. 6, 1954 3 Sheets-Sheet 1

INVENTOR.
ROBERT G. HEDTKE
BY
Carlsen + Boyle
ATTORNEYS

Dec. 20, 1955  R. G. HEDTKE  2,727,457
SLACK PULLER FOR AUTOMATIC TWINE-TYING BALERS
Filed Aug. 6, 1954  3 Sheets-Sheet 2

INVENTOR.
ROBERT G. HEDTKE
BY Carlsen & Hoyle
ATTORNEYS

Dec. 20, 1955  R. G. HEDTKE  2,727,457
SLACK PULLER FOR AUTOMATIC TWINE-TYING BALERS
Filed Aug. 6, 1954  3 Sheets-Sheet 3
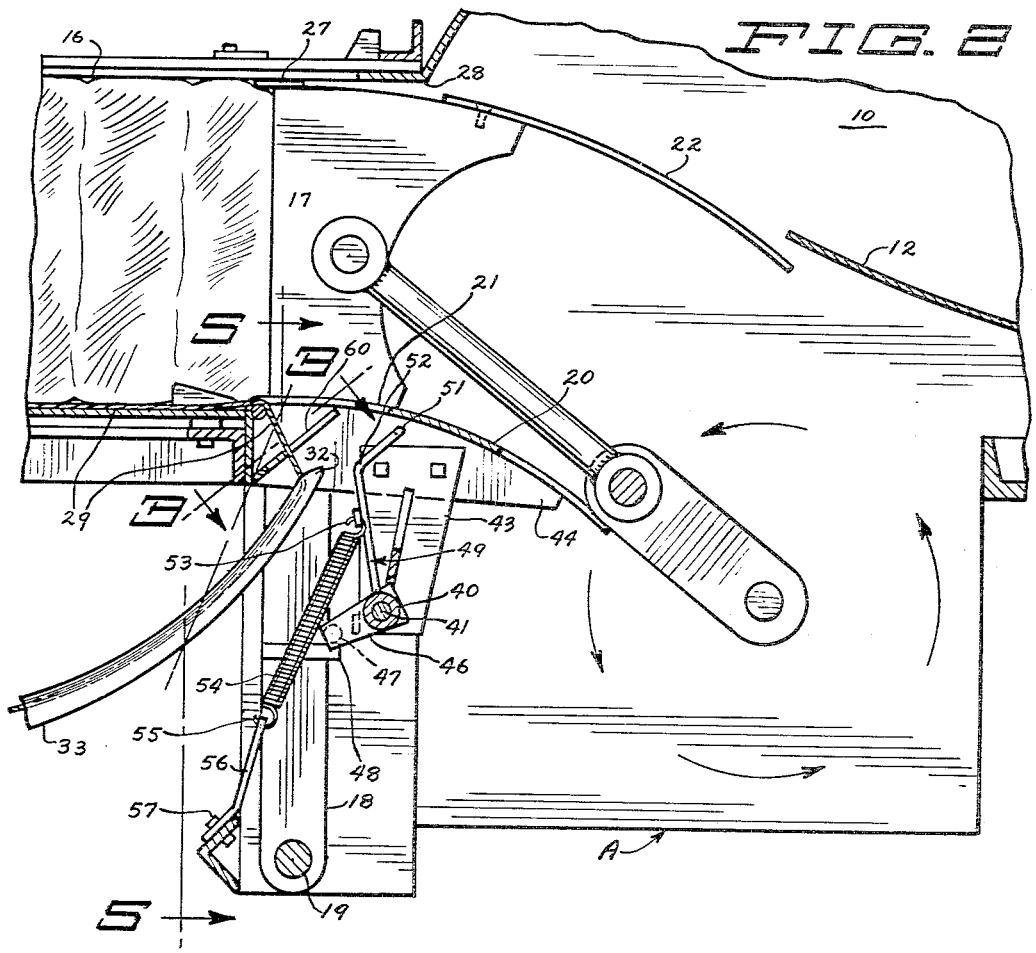
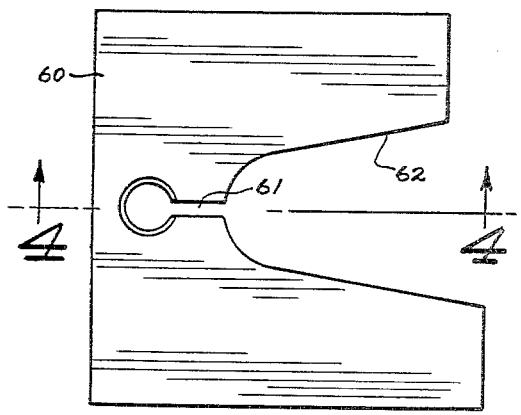
INVENTOR.
ROBERT G. HEDTKE
BY
Carlsen & Hagle
ATTORNEYS

United States Patent Office 2,727,457
Patented Dec. 20, 1955

2,727,457
SLACK PULLER FOR AUTOMATIC TWINE-TYING BALERS

Robert G. Hedtke, Excelsior, Minn., assignor to Minneapolis-Moline Company, Hopkins, Minn., a corporation of Minnesota Application August 6, 1954, Serial No. 448,296

9 Claims. (Cl. 100—21)

This invention relates generally to improvements in twine-tying balers for hay and like materials, and in which the hay is compressed in successive wads by a baling plunger and then automatically tied by knotting mechanisms and needles which dispose strands of twine around the completed bales. Such a machine is disclosed in the copending application of Benjamin L. Nikkel, Serial No. 430,619, filed May 18, 1954, to which application attention is invited for a complete disclosure of an automatic twine-tying baler of the type to which my present invention is particularly applicable.

The invention forming the subject matter of the present application more specifically relates to a mechanism for pulling slack in the twine, in synchronized relation to the overall operation of the machine. As the baling plunger forces each successive wad or charge of hay into the baling chamber the twine is pulled sharply and abruptly from the supply balls and one of the difficulties in the successful operation of twine-tying balers has been the tendency of the twine to become snarled and broken, due to this necessary jerking of the twine. It is the primary object of my invention, therefore, to provide mechanism operated by the baling plunger to pull slack in the twine between the needles and the baling chamber in advance of each working or compression stroke of the plunger, so that it is this slack which is pulled taut as each wad of hay is forced into the chamber. As a result breakage of the twine or other disturbance of the continued automatic operation of the baler due to difficulties with the twine are substantially eliminated.

Another object of my invention is to provide in a twine puller of this kind means for holding the slack clear of the needle's path so that the twine will always feed properly into the chamber.

A further object is to provide a slack pulling mechanism of this nature which is simple in construction and operative without difficulty or attention over long periods of time once it is properly adjusted.

These and other more detailed and specific objects will be disclosed in the course of the following specification, reference being had to the accompanying drawings, in which—

Fig. 3 is an enlarged detail view along the line 3—3 in Fig. 2.

Fig. 4 is a detail section along the line 4—4 in Fig. 3.

Fig. 5 is an enlarged detail cross section along the line 5—5 in Fig. 2.

Figure 1:
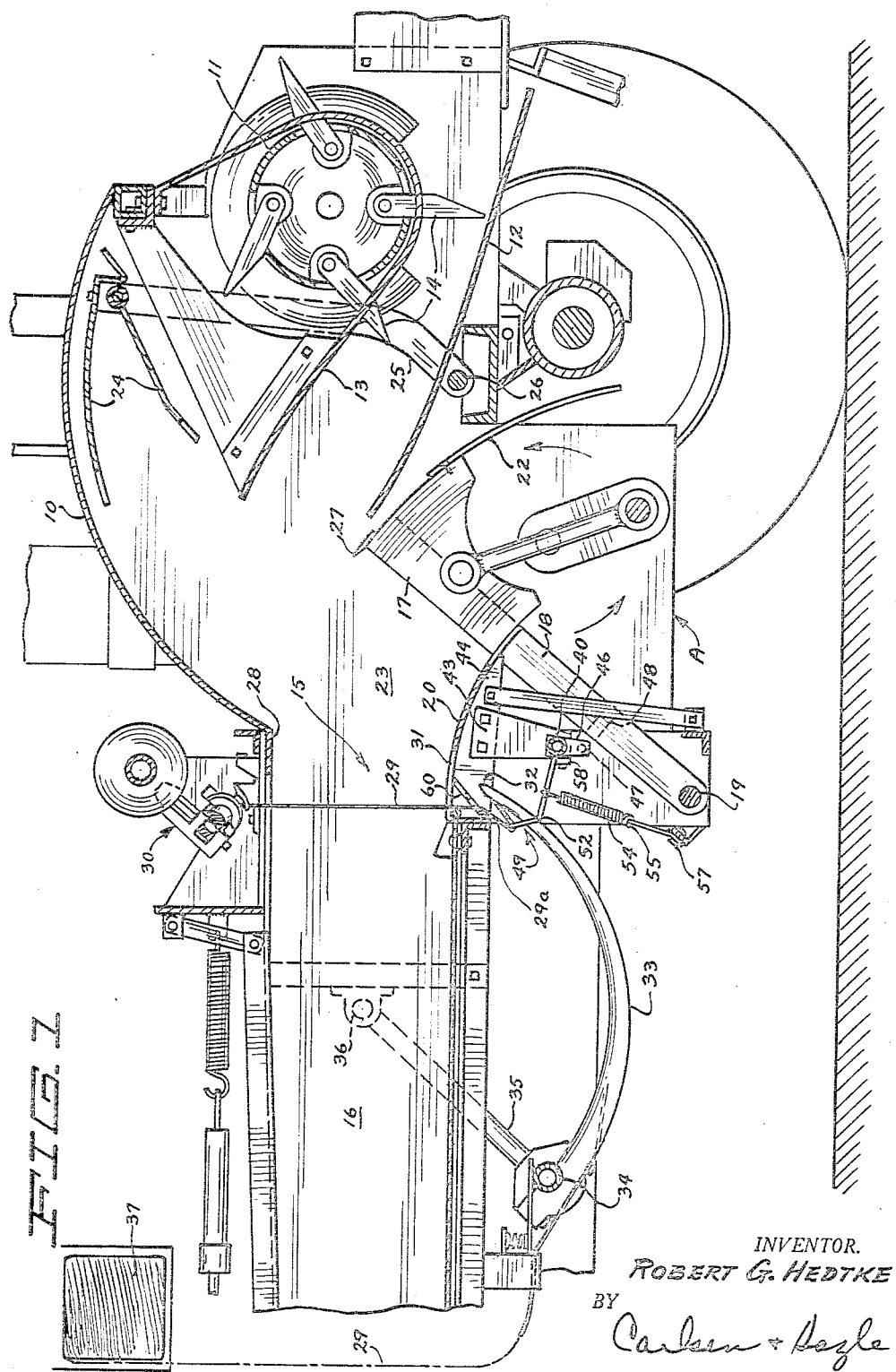
Fig. 1 is a vertical, longitudinal sectional view through the mid-portion of an automatic twine-tying baler with which my invention is associated, the slack puller being shown in the condition in which it stands before each working stroke of the plunger, and slack being shown pulled in the twine between the needles and baling chamber.
Figure 2:
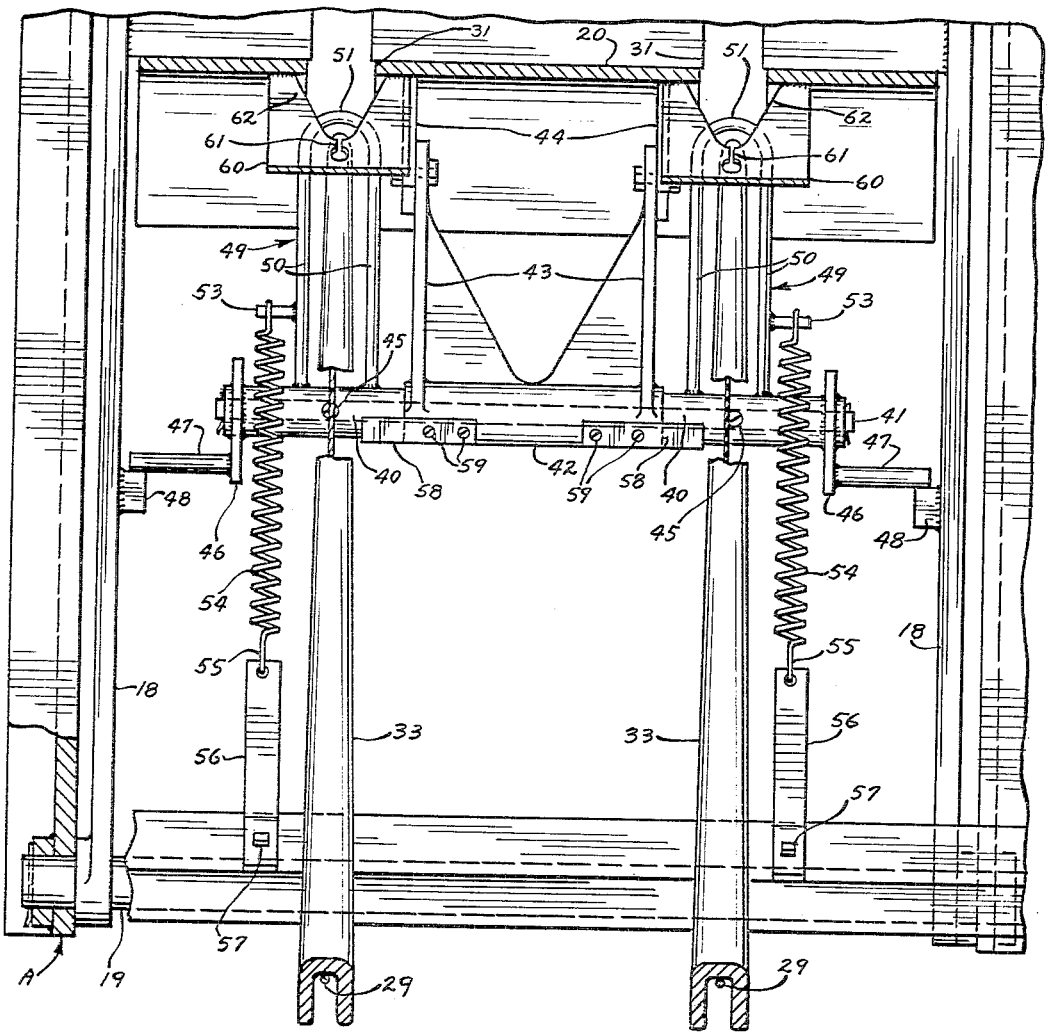
Fig. 2 is an enlarged fragmentary sectional view of the central part of Fig. 1, but showing the baling plunger as it completes its working stroke and takes up the slack in the twine.

Referring now more particularly and by reference characters to the drawing, A designates generally the travel mounted frame of a baler, such as disclosed in the Nikkel application aforesaid, and of which only such parts as pertinent to an understanding of the present invention will be described. In Fig. 1 the front end of the machine is to the right and the hay, or other material to be baled, is fed rearwardly or leftwardly into a feed housing 10 by a rotary feeder 11 which turns clockwise as viewed in the drawing to force the hay along over a bottom sheet 12. A stripper 13 strips the hay from teeth 14 upon the feeder and the hay is urged toward the forwardly opening mouth 15 of a baling chamber 16. An oscillating baling plunger or ram 17 is carried by side bars 18 pivoted at their lower ends at 19 to the frame so that the plunger may swing upwardly and rearwardly, into the open end of the baling chamber, from the rest position of Fig. 1 through a working stroke to the position of Fig. 2, and of course return to the rest position. In such travel the plunger 17 travels over a downwardly, forwardly curving bottom plate 20 forming a continuation of the bottom 21 of the baling chamber 16. This bottom plate 20 prevents downward discharge of the hay from the feed housing 10 and likewise such loss of the hay is prevented while the plunger moves on its working and return strokes by a similarly curved wing plate 22 in the upper part of the plunger. The hay is fed into the area 23 (Fig. 1) between the face of the plunger 17 and open mouth 15 of the chamber by an oscillating packer 24 carried by side bars 25 pivoted at lower ends at 26 in the baler frame, the packer moving downward and rearward in advance of each working stroke of the plunger and then returning to the rest position of Fig. 1. Thus it will be seen that the properly synchronized strokes of the plunger and packer will force successive wads or charges of the hay into the baling chamber 16 and to sever such wads from the hay remaining in the feed housing the plunger 17 has a cutter blade 27 cooperating with a shear edge 28 on the upper forward end of the chamber in a well known fashion.

Preliminary to the formation of each bale a strand of twine 29 is held by knotter mechanisms 30 so that the twine is stretched vertically through the baling chamber 16 near its mouth, such knotter mechanisms being wholly conventional and located above the forward end of the chamber as seen in Fig. 1. There is a strand of such twine at each side of the chamber to thereby encompass the completed bales with two strands and the twine originally extends downward through openings 31 in the bottom plate 20 and into the ends 32 of curved tying needles 33, also as seen in Fig. 1. These needles 33 are channel-shaped in cross section (Fig. 5) and at rear ends are connected by a transverse yoke 34 having upwardly-forwardly extending ends 35 which are pivoted at 36 to the sides of the baling chamber. The twine at each side is taken from suitable supply balls 37 shown only schematically herein and from which the twine is led forwardly and upwardly in the channels of the needles, off their ends 32 into the baling chamber. As each successive wad of hay is forced into the baling chamber the strands of twine 29 are forced rearwardly to encompass the top, rear end and bottom of the accumulating bale, until when the bale is completed the needles 33 are operated in a working stroke forwardly and upwardly through the openings 31 so that their ends 32 carry the twine up into the knotting mechanisms 30 to complete the encompassing of the bale by the strands. As this occurs the knotting mechanisms knot the twine ends together, sever the knots and again grip the severed twine so that the return stroke of the needles will re-string the twine vertically through the chamber, as in Fig. 1. All of these operations are, of course, properly synchronized so that the machine operates entirely automatically to produce twine tied bales rapidly and effectively.

Difficulty, however, arises in the proper feeding of the twine into the baling chamber due to the fact that the twine has many loose fibers which when wound into and between the strands in the balls tend to cause the twine to pull off with uneven resistance and also and very seriously from the fact that the twine is pulled sharply or jerked as each wad of hay is forced into the baling chamber, in the manner just described. Various forms and combinations of tensioning means have been tried for applying variable tension to the twine between the supply balls and needles, with some measure of success but in accordance with my invention I attack and solve this problem in another way as will now be described.

Heretofore in the rest positions of the operating parts the twine 29 has extended tautly from the knotting mechanisms 30 to the ends 32 of the needles so that each wad of hay forced rearwardly into the baling chamber 16 has pulled twine directly from the supply balls 37. My slack pulling mechanism, however, acts to pull slack in the twine between the baling chamber and the ends of the needles, such slack or loop being designated at 29a in Fig. 1, and it is this slack then which is taken up as the wads are forced into the chamber and the action of feeding the hay into the chamber does not itself pull the twine from the balls.

Tubular, transversely extending rock shafts 40 are secured upon a shaft 41 which is journaled intermediate its ends in a wide bearing sleeve 42 suspended by hangers 43 from flanges 44 beneath the bottom plate 20. Set screws 45 or equivalent secure the rock shafts 40 upon the shaft 41 (Fig. 5) and short lever arms 46 are secured to and depend from the opposite ends of the respective rock shafts. At their free extremities the lever arms 46 have outwardly projecting actuator studs or cam acting elements 47 which cooperate with cam acting elements or shoulders 48 upon the adjacent inner surfaces of the side bars 18 which swing the baling plunger 17. Inverted U-shaped heavy wire or rod loops or twine pulling elements 49 have their legs 50 (Fig. 5) secured to the rock shafts 40 while the free ends of the loops are closed, as at 51. It will also be noted that the free ends of the loops 49 are offset forwardly or upwardly at the points 52 and 53 that each loop has a laterally extending stud 53 over which one end of a retractile coil spring 54 is hooked, the other lower end of the spring being hooked at 55 to a strap 56 secured at 57 to the frame of the baler below the loops and the rock shafts. So arranged the springs 54 tend to rotate the rock shafts 40 in a counterclockwise direction as viewed in Figs. 1 and 2 and to thereby swing the loops 49 rearwardly and downwardly at their free, closed ends 51. The parts are so proportioned and centers so located that the loops 49 will clear and straddle the needle ends 32 with the closed ends of the loops passing rearwardly and downwardly over the needle ends when the springs 54 are permitted to turn the rock shafts 40, but with this movement limited by stops 58 secured to the bearing sleeve 42 at 59 and projecting into the path of the adjacent inner legs of the loops as clearly shown. Also the arrangement is such that as the baling plunger 17 moves rearwardly on its working stroke the cam shoulders 48 upon the inner sides of the side bars 18 will engage and cam under the actuator studs 47, swinging the loops 49 upward and forward to the position shown in Fig. 2, the return movement to the rest position of the plunger causing the shoulders to clear the studs 47 and permitting the springs 54 to move the loops back rearwardly against the stops 58. Thus it will be apparent that the springs 54 operate the loops 49 in the rearward direction while the plunger 17 operates the loops forwardly, in timed relation to the plunger action.

As the closed ends 51 of the loops 49 move rearwardly they pass between the ends 32 of the needles and the baling chamber and, coming in contact with the twine, in so doing the loops pull the slack 29a in the twine back behind the needle ends. Then as the baling plunger 17 moves on its working stroke the loops 49 are cammed forward freeing the slack 29a to be drawn into the baling chamber, obviously without imparting any abrupt jerks to the twine coming off the supply balls 37, thus solving the problems aforesaid. The loops 49 are gradually freed by the baling plunger as the same moves toward its rest position and thus do not themselves jerk upon the twine, the whole action being so smoothly performed that effective and trouble-free operation is the result.

It is desirable that the slack 29a pulled in the twine be held out of the way so that it cannot become entangled, particularly when the needles are operated in the knotting cycle and for this purpose I provide at each side of the machine a twine retainer or holder 60 in the form of a rectangular plate which is suitably secured to the adjacent web 44 of the bottom plate 20, upwardly and rearwardly of the ends 32 of the needles and below the openings 31. These twine holder plates angle upwardly and forwardly and have key-hole shaped notches 61 aligned with the twine 29, and which notches have forwardly, widely flared throats 62. As clearly shown in Fig. 1 the loops 49 as they swing rearwardly and pull the slack in the twine will also move the slack through the throats 62 and into the notches 61 of the twine holders. The narrowest dimension of the notches 61 is so related to the diameter of the twine that the slack will then be frictionally retained in the holders, until pulled therefrom by the action of the baling plunger. Thus the slack twine is held to the rear of the needle ends, out of the way until needed, without dangling or tangling.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a baler having a baling chamber, a baling plunger movable from a rest position toward the chamber and return, and mechanism for disposing and tying twine around the completed bales and including needles movable into the chamber; twine pulling mechanism comprising twine pulling elements having ends for engaging the twine and means pivotally supporting the said elements, springs arranged to swing the twine pulling elements in one direction and pull slack in the twine between the needles and baling chamber, means operated by the plunger to swing the twine pulling elements in the opposite direction to free the slack on each movement of the plunger toward the baling chamber, and twine holders located in position to frictionally grip the slack pulled in the twine and hold the slack clear of the needles.

2. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a support, closed end loops movably mounted on the support, springs connected between the loops and support and operative to move the loops in one direction and cause the closed ends of the loops to engage the twine between the needles and chamber and pull slack twine from the supply means, cooperating means connected to the loops and baling plunger and operative to mechanically overcome said springs and move the loops in an opposite direction on each working stroke of the plunger to release the slack pulled in the twine, and notched twine holders carried by the support and frictionally engaging the slack as it is pulled by the loops to hold the slack in the clear until pulled up on the working stroke of the plunger.

3. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a support, closed end loops movably mounted on the support, springs connected between the loops and support and operative to move the loops in one direction and cause the closed ends of the loops to engage the twine between the needles and chamber and pull slack twine from the supply means, cooperating means connected to the loops and baling plunger and operative to mechanically overcome said springs and move the loop in an opposite direction on each working stroke of the plunger to release the slack pulled in the twine, and notched twine holders carried by the support and frictionally engaging the slack as it is pulled by the loops to hold the slack in the clear until pulled up on the working stroke of the plunger, the said twine holders having key-hole shaped notches constricted to frictionally retain the slack twine and flaring throats extending from the notches to guide slack twine thereinto.

4. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a pair of rock shafts carried by the frame, closed end loops mounted on said rock shafts and movable in one direction across the path of the needles to engage and pull slack in the twine between the needles and baling chamber and movable in the opposite direction to release the slack in the twine, springs connected to the loops to move them in the direction for pulling the slack in the twine, and means carried by the plunger for moving the loops in the opposite direction and release the slack as the plunger moves on its working stroke.

5. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a pair of rock shafts carried by the frame, closed end loops mounted on said rock shafts and movable in one direction across the path of the needles to engage and pull slack in the twine between the needles and baling chamber and movable in the opposite direction to release the slack in the twine, springs connected to the loops to move them in the direction for pulling the slack in the twine, lever arms connected to the rock shafts, and cam acting elements connected to the rock shafts and baling plunger and operative as the plunger moves on its working stroke to release the slack twine.

6. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a support, closed end loops movably mounted on the support for movement through and away from the path of the twine between the needles and baling chamber and operative when moved through said path to pull slack in the twine, spring means for moving the loops in one direction, and means operative by the baling plunger to move the loops in the other direction.

7. For a baler having a frame, a baling chamber and a baling plunger supported for movement from a rest position through a working stroke and return to compress successive charges of hay into the chamber, supply means for twine and means for feeding the twine into the chamber around the bales as they are formed and including tying needles from the ends of which the twine passes into the chamber; twine pulling mechanism for pulling sufficient slack in the twine between the needles and chamber to accommodate each successive charge of hay, comprising in combination, a support, closed end loops movably mounted on the support for movement through and away from the path of the twine between the needles and baling chamber and operative when moved through said path to pull slack in the twine, spring means for moving the loops in one direction, means operative by the baling plunger to move the loops in the other direction, and twine holding means for frictionally engaging and holding the slack twine between the needles and baling chamber.

8. For a baler having a baling chamber, a baling plunger movable from a rest position toward the chamber and return, a supply of twine for tying the bales, and mechanism for disposing twine around bales formed in said chamber and including a needle movable from a rest position into the baling chamber and return and off the ends of which needle the twine from said supply passes into the chamber; twine pulling mechanism comprising a support adjacent the end of the needle, a twine pulling element movable on said support, spring means for moving said element in one direction, the said element having a portion operative when the element moves in this direction for engaging the twine between the needle end and the chamber and pulling slack in the twine, and means operated by the baling plunger as it moves toward the chamber for moving said element in an opposite direction to release the slack pulled in the twine.

9. For a baler having a baling chamber, a baling plunger movable from a rest position toward the chamber and return, a supply of twine for tying the bales, and mechanism for disposing the twine around bales formed in said chamber and including a needle movable from a rest position into the baling chamber and return and off the ends of which needle the twine from said supply passes into the chamber; twine pulling mechanism comprising a support adjacent the end of the needle, a twine pulling element movable on said support, spring means for moving said element in one direction, the said element having a portion operative when the element moves in the direction for engaging the twine between the needle end and the chamber and pulling slack in the twine, means operated by the baling plunger as it moves toward the chamber for moving said element in an opposite direction to release the slack pulled in the twine, and a twine holder located in position to frictionally grip the slack pulled in the twine and hold the slack clear of the needle.

References Cited in the file of this patent

UNITED STATES PATENTS

| | | |
|---|---|---|
| 561,265 | Martindale et al. | June 2, 1896 |
| 808,153 | Heidt | Dec. 26, 1905 |
| 1,257,474 | Freeman | Feb. 26, 1918 |
| 2,649,043 | Jones et al. | Aug. 18, 1953 |